(12) United States Patent
Maruko et al.

(10) Patent No.: US 12,709,042 B2
(45) Date of Patent: Aug. 18, 2026

(54) REINFORCING-FIBER RECOVERY REACTOR AND METHOD OF PRODUCING RECYCLED REINFORCING FIBERS

(71) Applicant: Miraikasei Inc., Chikuma (JP)

(72) Inventors: Haruna Maruko, Chikuma (JP); Kenji Furusho, Hachinohe (JP)

(73) Assignee: MIRAIKASEI INC., Chikuma (JP)

( * ) Notice: Subject to any disclaimer, the term of this patent is extended or adjusted under 35 U.S.C. 154(b) by 594 days.

(21) Appl. No.: 18/039,725

(22) PCT Filed: Nov. 26, 2021

(86) PCT No.: PCT/JP2021/043454
§ 371 (c)(1),
(2) Date: Jun. 1, 2023

(87) PCT Pub. No.: WO2022/118756
PCT Pub. Date: Jun. 9, 2022

(65) Prior Publication Data
US 2024/0025084 A1 Jan. 25, 2024

(30) Foreign Application Priority Data
Dec. 2, 2020 (JP) ................................ 2020-200195

(51) Int. Cl.
*B29B 17/00* (2006.01)
*B29B 17/02* (2006.01)

(52) U.S. Cl.
CPC .......... *B29B 17/0047* (2013.01); *B29B 17/02* (2013.01); *B29B 2017/0293* (2013.01)

(58) Field of Classification Search
CPC ..... B29B 17/04; B29B 17/02; B29B 17/0047; B29B 2017/0436; B29B 2017/0293; B09B 3/70; B09B 2101/75; Y02W 30/62
See application file for complete search history.

(56) References Cited

U.S. PATENT DOCUMENTS 4,196,105 A * 4/1980 Kubat ...................... C08J 11/08
528/487
4,249,562 A 2/1981 King, Sr.
(Continued)

FOREIGN PATENT DOCUMENTS

CA 2105142 A1 3/1995
CN 109760230 A 5/2019
(Continued)

OTHER PUBLICATIONS

The Second Office Action mailed Jul. 26, 2025, in Chinese Application No. 202180079668.8, 9 pages including English translation.
(Continued)

*Primary Examiner* — Monica A Huson
(74) *Attorney, Agent, or Firm* — XSENSUS LLP

(57) ABSTRACT

Provided are a reinforcing-fiber recovery reactor and a method of producing recycled reinforcing fibers capable of maintaining the shape and orientation of reinforcing fiber bundles when the reinforcing fibers are separated from a fiber-reinforced resin material by a solvent method.

Provided is a reinforcing-fiber recovery reactor used for recovering reinforcing fibers from a fiber-reinforced resin material by a solvent method, the reactor comprising: a reaction vessel that can accommodate the fiber-reinforced resin material and a solvent; and a fixing mechanism comprising a pressing member capable of pressing the fiber-reinforced resin material, the fixing mechanism being capable of fixing the accommodated fiber-reinforced resin material by pressing the fiber-reinforced resin material with the pressing member.

12 Claims, 7 Drawing Sheets

(56) References Cited

U.S. PATENT DOCUMENTS

| | | | |
|---|---|---|---|
| 2014/0120026 | A1 | 5/2014 | Itazu et al. |
| 2015/0266019 | A1 | 9/2015 | Longenbach et al. |
| 2017/0081785 | A1 | 3/2017 | Stonecipher |
| 2017/0165876 | A1 | 6/2017 | Goh et al. |
| 2020/0039115 | A1 | 2/2020 | Gross et al. |

FOREIGN PATENT DOCUMENTS

| | | | |
|---|---|---|---|
| JP | H07-26057 | A | 1/1995 |
| JP | 3072696 | U | 10/2000 |
| JP | 2001040134 | A | 2/2001 |
| JP | 2001240697 | A | 9/2001 |
| JP | 2020-011482 | A | 1/2020 |
| JP | 2020-029552 | A | 2/2020 |
| WO | 2017052229 | A1 | 3/2017 |

OTHER PUBLICATIONS

International Search Report and Written Opinion mailed on Feb. 8, 2022, received for PCT Application PCT/JP2021/043454, filed on Nov. 26, 2021, 9 pages including English Translation.

Supplementary European Search Report mailed May 16, 2024, in European Application No. 21900510.5, 5 pages.

* cited by examiner

REINFORCING-FIBER RECOVERY REACTOR AND METHOD OF PRODUCING RECYCLED REINFORCING FIBERS

CROSS REFERENCE TO RELATED APPLICATIONS

The present application is based on PCT filing PCT/JP2021/043454, filed Nov. 26, 2021, which claims the benefit of priority from Japanese Patent Application No. 2020-200195, filed Dec. 2, 2020, in Japan, the entire content of each are incorporated herein by reference.

TECHNICAL FIELD

The present invention relates to a reinforcing-fiber recovery reactor and a method of producing recycled reinforcing fibers.

BACKGROUND ART

Fiber reinforced plastics (FRP) using fibers such as glass fibers as a reinforcing material are lightweight, high strength and high elasticity materials, and are widely used for members of small ships, automobiles, railway vehicles, and the like. In addition, carbon fiber reinforced plastics (CFRP) using carbon fibers as a reinforcing material have been developed for further reducing weight, increasing strength and increasing elasticity, and are used for members of aircraft, automobiles, and the like.

In recent years, the amount of fiber reinforced plastic waste has tended to increase, and the development of recycling technology is being studied. Methods for recovering reinforcing fibers from fiber reinforced plastics mainly include a pyrolysis method, in which a resin component is thermally decomposed and removed by heat treatment to thereby recover reinforcing fibers, and a solvent method, in which a resin component is dissolved in a solvent and removed to thereby recover reinforcing fibers. Among these methods, the solvent method is advantageous from the viewpoint of resource recycling since the resin component can be easily recovered.

An example of the solvent method is proposed in PTL 1. PTL 1 discloses a method including the steps of: obtaining cut pieces by cutting a block of composite material containing an inorganic material and an organic material; and obtaining crushed pieces by crushing the cut pieces. In PTL 1, as a method of separating the inorganic material and the organic material of the crushed pieces, a method of decomposing the organic material using a treatment solution capable of decomposing the organic material contained in the crushed pieces and recovering the inorganic material is proposed.

CITATION LIST

Patent Literature

[PTL 1] JP 2020-011482 A

SUMMARY OF INVENTION

Technical Problem

However, in the solvent method, it is necessary to agitate the mixture of the solvent and the fiber-reinforced resin material in order to efficiently dissolve the resin component contained in the fiber-reinforced resin material. When the mixture is agitated, it is difficult to maintain the shape and orientation of fiber bundles of the reinforcing fibers present in the fiber-reinforced resin material. If the shape and orientation of fiber bundles of the reinforcing fibers cannot be maintained, the fiber directions of the recovered reinforcing fibers are not aligned, and the applications of the recovered reinforcing fibers are limited.

Therefore, an object of the present invention is to provide a reinforcing-fiber recovery reactor and a method of producing recycled reinforcing fibers capable of maintaining the shape and orientation of reinforcing fiber bundles when the reinforcing fibers are separated from a fiber-reinforced resin material by a solvent method.

Solution to Problem

The inventors of the present invention have studied how to maintain the shape and orientation of the reinforcing fibers in the fiber-reinforced resin material when using the solvent method, and found that the shape and orientation of the reinforcing fibers are maintained when the fiber-reinforced resin material itself can be fixed at a fixed position. The inventors of the present invention conducted further studies based on the above findings, and arrived at the present invention.

The gist of the present invention is as follows.

(1) A reinforcing-fiber recovery reactor used for recovering reinforcing fibers from a fiber-reinforced resin material by a solvent method, the reactor including:
- a reaction vessel that can accommodate the fiber-reinforced resin material and a solvent; and
- a fixing mechanism comprising a pressing member capable of pressing the fiber-reinforced resin material, the fixing mechanism being capable of fixing the accommodated fiber-reinforced resin material by pressing the fiber-reinforced resin material with the pressing member.

(2) The reinforcing-fiber recovery reactor according to (1), wherein the pressing member has a plate shape.

(3) The reinforcing-fiber recovery reactor according to (1) or (2), wherein the pressing member has a pressing surface configured to be pressed against the fiber-reinforced resin material, the pressing member being reciprocable in a direction perpendicular to the pressing surface.

(4) The reinforcing-fiber recovery reactor according to any one of (1) to (3), wherein the fixing mechanism comprises a support member configured to support the fiber-reinforced resin material between the pressing member and the support member.

(5) The reinforcing-fiber recovery reactor according to (4), wherein the support member has a plate shape.

(6) The reinforcing-fiber recovery reactor according to (4) or (5), wherein the support member is reciprocable toward and away from the pressing member.

(7) The reinforcing-fiber recovery reactor according to any one of (4) to (6), further including an elastic member that supports the support member.

(8) The reinforcing-fiber recovery reactor according to (7), wherein the elastic member is a compression coil spring.

(9) The reinforcing-fiber recovery reactor according to any one of (4) to (8), further including a regulating member that regulates movement of the support member.

(10) The reinforcing-fiber recovery reactor according to any one of (1) to (9), wherein the reaction vessel has an opening for introducing the fiber-reinforced resin material, and the reaction vessel is configured to be tiltable to tilt the opening downward.

(11) The reinforcing-fiber recovery reactor according to any one of (1) to (10), wherein the reinforcing fibers comprises carbon fibers.

(12) A method of producing recycled reinforcing fibers, the method including a step of subjecting a fiber-reinforced resin material comprising reinforcing fibers and a resin component to treatment with a treatment solution comprising a solvent using the reinforcing-fiber recovery reactor according to any one of (1) to (11) to dissolve at least part of the resin component in the treatment solution, wherein the fiber-reinforced resin material is subjected to treatment with the treatment solution in the step while being fixed by the fixing mechanism.

(13) A method of producing recycled reinforcing fibers, the method including a step of subjecting a fiber-reinforced resin material comprising reinforcing fibers and a resin component to treatment with a treatment solution comprising a solvent to dissolve at least part of the resin component in the treatment solution, wherein the fiber-reinforced resin material is subjected to treatment with the treatment solution in the step while being pressed and fixed.

(14) The method of producing recycled reinforcing fibers according to (12) or (13), wherein the solvent is agitated in the step while the fiber-reinforced resin material is fixed.

Advantageous Effects of Invention

According to the above configuration, it is possible to provide a reinforcing-fiber recovery reactor and a method of producing recycled reinforcing fibers capable of maintaining the shape and orientation of reinforcing fiber bundles when the reinforcing fibers are separated from a fiber-reinforced resin material by a solvent method.

DESCRIPTION OF EMBODIMENTS

Figure 1:
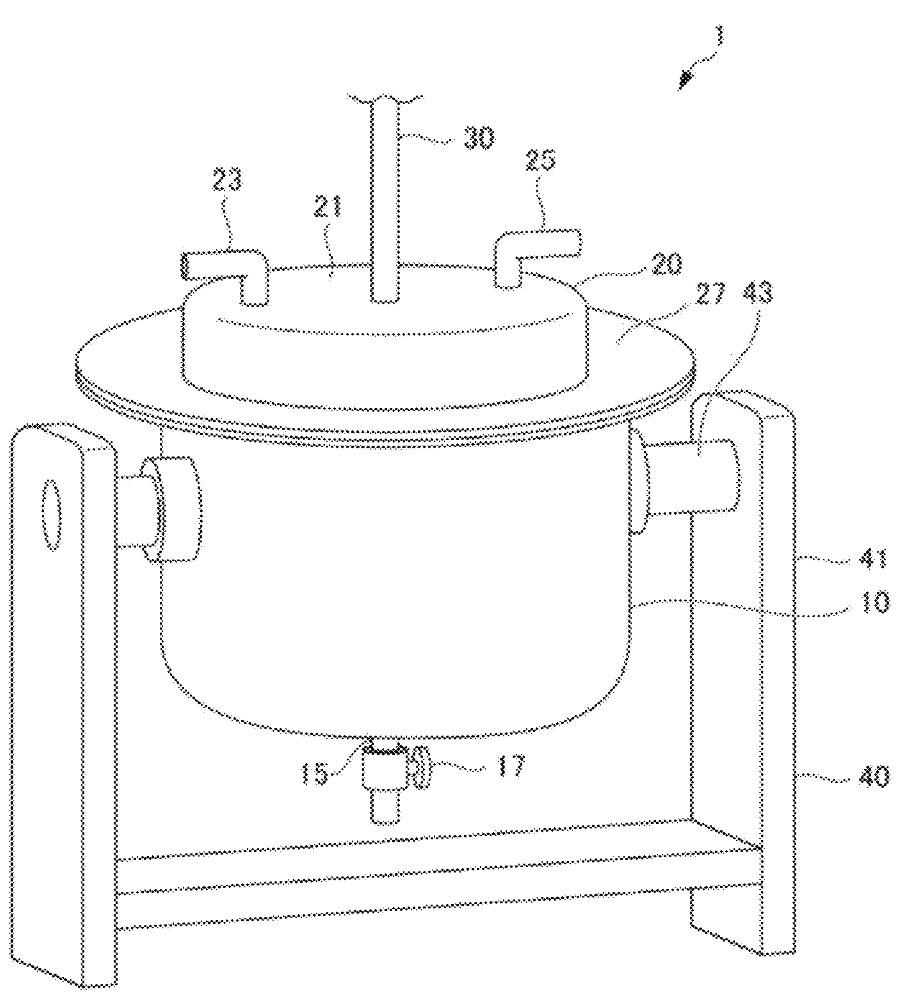
FIG. 1 is a perspective view schematically illustrating a reinforcing-fiber recovery reactor according to an embodiment of the present invention.

With reference to the drawings, preferred embodiments of the present invention will be described in detail. In the drawings, components that do not need to be described are omitted for ease of illustration. Further, the dimensions of each component in the drawings are appropriately enlarged or reduced for ease of illustration, and do not indicate any actual scale of each component.

Figure 2:
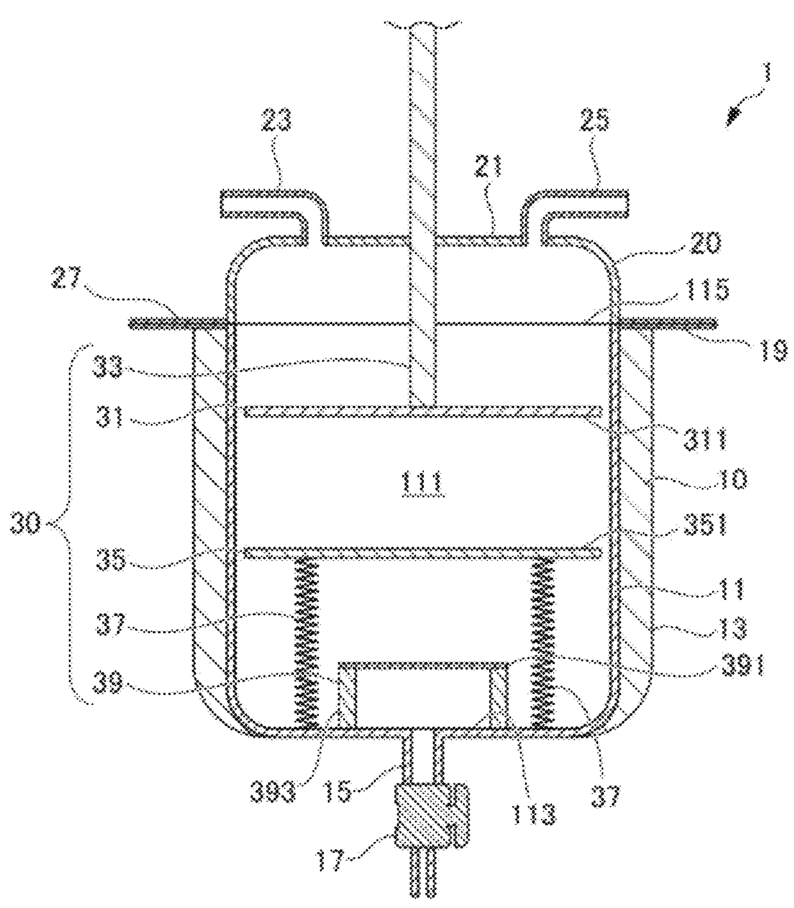
FIG. 2 is a partial cross-sectional view of the reinforcing-fiber recovery reactor shown in FIG. 1.

FIG. 1 is a perspective view schematically illustrating a reinforcing-fiber recovery reactor according to an embodiment of the present invention, and FIG. 2 is a partial cross-sectional view of the reinforcing-fiber recovery reactor shown in FIG. 1.

A reinforcing-fiber recovery reactor 1 shown in FIG. 1 is used to recover reinforcing fibers from a fiber-reinforced resin material by a solvent method. The fiber-reinforced resin material is a resin material reinforced by embedded reinforcing fibers such as carbon fibers. Details of the fiber-reinforced resin material will be described later.

A reinforcing-fiber recovery reactor 1 includes a reaction vessel 10, a lid 20, a fixing mechanism 30 and a support base 40. In the following description, each component of the reinforcing-fiber recovery reactor 1 will be specifically described in order.

The reaction vessel 10 is capable of accommodating a fiber-reinforced resin material and a solvent. As shown in FIG. 2, the reaction vessel 10 includes a reaction vessel body 11, a temperature control jacket 13, a drain port 15, a valve 17 and a flange 19.

The reaction vessel body 11 is a bottomed cylindrical vessel having a bottom 113 at the bottom and an opening 115 at the top. The reaction vessel body 11 includes an accommodation space 111 capable of accommodating a fiber-reinforced resin material and a solvent. Materials required for reaction of a fiber-reinforced resin material, a solvent, and the like are introduced into the accommodation space 111 of the reaction vessel body 11 through the opening 115.

The temperature control jacket 13 is disposed covering the outer peripheral side surface of the reaction vessel body 11. The temperature control jacket 13 is capable of controlling the temperature of the contents by heating and/or cooling the contents accommodated in the reaction vessel body 11. A heating medium, such as water, is passed through the temperature control jacket 13 to exchange heat to thereby control the temperature of the contents. Alternatively, the temperature control jacket 13 may be a heating means such as an electric heater.

The drain port 15 is provided in the bottom 113 of the reaction vessel body 11, and liquid such as a treatment solution can be discharged from the accommodation space 111 of the reaction vessel body 11 through the drain port 15. Further, a valve 17 is provided in the drain port 15, and opening and closing of the drain port 15 can be controlled by operating the valve 17.

The flange 19 is a disk-shaped member that protrudes from the outer peripheral edge of the reaction vessel body 11 near the opening 115. The flange 19 is configured to abut a flange 27 of the lid 20, which will be described later, during reaction to prevent, together with the flange 27, leakage of the contents of the reaction vessel body 11. Further, by fixing the flange 19 and the flange 27 to each other, the lid 20 can be fixed to the reaction vessel body 11.

The lid 20 is a detachable lid capable of opening and closing the reaction vessel 10, and can close the reaction vessel 10 by being disposed covering the opening 115. The lid 20 includes a lid body 21, an injection port 23, an exhaust port 25 and a flange 27.

The lid body 21 is a main part of the lid 20, and has a shape of an inverted bowl. A through hole is formed in a center part of the lid body 21, and a control member 33 of the fixing mechanism 30, which will be described later, extends through the through hole. The injection port 23 and the exhaust port 25 are attached to the lid body 21.

The injection port 23 is a pipe for injecting a treatment solution such as a solvent. The exhaust port 25 is a pipe for removing an excess gas, such as vapor, generated in use of the reaction vessel 10. In the present embodiment, the injection port 23 and the exhaust port 25 are provided on the top of the lid body 21. However, the present invention is not limited to the illustrated embodiment, and the injection port 23 and the exhaust port 25 can be attached to any position of the lid body 21 or any position of the reaction vessel 10. Also, a plurality of injection ports 23 and exhaust ports 25 may be provided according to the application.

The flange 27 is a disk-shaped member that protrudes from the outer peripheral edge of the lid body 21 on the side of the opening 115 of the reaction vessel 10. The flange 27 is configured to abut the flange 19 of the reaction vessel 10 during reaction to prevent, together with the flange 19, leakage of the contents of the reaction vessel body 11.

The fixing mechanism 30 fixes the fiber-reinforced resin material by pressing it in use of the reinforcing-fiber recovery reactor 1. The fixing mechanism 30 includes a pressing member 31, a control member 33, a support member 35, an elastic member 37 and a regulating member 39.

The pressing member 31 is disposed in the accommodation space 111 of the reaction vessel 10 in use of the reinforcing-fiber recovery reactor 1. The pressing member 31 has a plate shape having a pressing surface 311 for pressing the fiber-reinforced resin material. In the present embodiment, the pressing member 31 is disposed with the pressing surface 311 being horizontal and substantially parallel to a support surface 351 of the support member 35. The position of the pressing member 31 having the above configuration is controlled by the control member 33 so that the pressing surface 311 can be pressed against the fiber-reinforced resin material.

The area of the pressing surface 311 of the pressing member 31 is not particularly limited, but may be, for example, 10% or more and 90% or less, preferably 30% or more and 50% or less, of the cross-sectional area of the accommodation space 111 parallel to the pressing surface 311. Accordingly, while the fiber-reinforced resin material is fixed by the pressing member 31, a treatment solution can easily flow in the accommodation space 111, which facilitates permeation of the treatment solution into the fiber-reinforced resin material.

The control member 33 is a rod-shaped member with one end connected to the pressing member 31. The other end of the control member 33 penetrates the lid body 21 and is connected to a driving device (not shown). As the control member 33 moves in a direction perpendicular to the pressing surface 311 (i.e., vertically in the drawing), the pressing member 31 can move in the direction perpendicular to the pressing surface 311.

The support member 35 is disposed under the control member 33 in the accommodation space 111. The support member 35 has a plate shape and is disposed with the support surface 351 on one side facing the pressing surface 311. When the pressing member 31 presses the fiber-reinforced resin material, the support member 35 supports the fiber-reinforced resin material between the support surface 351 and the pressing member 31. Thus, while the fiber-reinforced resin material is pressed by the pressing member 31, the fiber-reinforced resin material can be fixed between the pressing member 31 and the support member 35.

The area of the support surface 351 of the support member 35 is not particularly limited, but may be, for example, 10% or more and 90% or less, preferably 30% or more and 50% or less, of the cross-sectional area of the accommodation space 111 parallel to the support surface 351. Accordingly, while the fiber-reinforced resin material is fixed by the support member 35, a treatment solution can easily flow in the accommodation space 111, which facilitates permeation of the treatment solution into the fiber-reinforced resin material.

The elastic member 37 is disposed between the support member 35 and the bottom 113 of the reaction vessel body 11 to support the support member 35. The elastic member 37 is a compression coil spring. Due to such an elastic member 37 supporting the support member 35, the support member 35 can move downward according to the pressing force from the pressing member 31. This prevents excessive pressure from being applied to the fiber-reinforced resin material, and suppresses damage to the reinforcing fibers in the fiber-reinforced resin material. Further, due to the elastic member 37 being provided, the support member 35 can reciprocate corresponding to reciprocation of the pressing member 31. As the pressing member 31 and the support member 35 reciprocate, the treatment solution in the accommodation space 111 is agitated.

The regulating member 39 includes a regulating plate 391 and a connecting member that connects the regulating plate 391 to the bottom 113 of the reaction vessel body 11. The regulating plate 391 is fixed substantially parallel to the support member 35 between the support member 35 and the bottom 113 of the reaction vessel body 11. When the support member 35 moves downward, it abuts the regulating plate 391 of the regulating member 39, whereby the downward movement of the support member 35 is regulated. That is, the regulating member 39 controls the position to which the support member 35 can move downward. Since the fixing mechanism 30 has the regulating member 39, it is possible to compress the fiber-reinforced resin material between the pressing member 31 and the support member 35 by moving the pressing member 31 downward.

The support base 40 shown in FIG. 1 is a base supporting the reaction vessel 10. The support base 40 includes a support base body 41 and a rotary shaft 43. The support base body 41 has pillar-shaped legs and is placed on the ground. The rotary shaft 43 is rotatably connected to the upper part of the support base body 41 and the reaction vessel 10. This enables tilting of the reaction vessel 10. As a result, the opening 115 of the reaction vessel 10 can be tilted downward, which facilitates introduction of the fiber-reinforced resin material and removal of the reinforcing fibers after reaction.

As described above, in the reinforcing-fiber recovery reactor 1 according to the present embodiment, a reaction can be performed while the fixing mechanism 30 presses and fixes the fiber-reinforced resin material. Accordingly, when the fiber-reinforced resin material is subjected to treatment with the treatment solution containing the solvent, the shape of the reinforcing fibers in the fiber-reinforced resin material becomes less likely to be deformed. In particular, even after the resin component in the fiber-reinforced resin material is dissolved and the reinforcing fibers are exposed during treatment, the reinforcing fibers are less likely to be entangled since the reinforcing fibers are fixed by the fixing mechanism 30. As a result, it is possible to maintain the shape and fiber direction of the obtained recycled reinforcing fibers, and for example, maintain the fiber direction of the obtained recycled reinforcing fibers in one direction, which improves the physical properties, such as physical strength, of the fiber-reinforced resin material produced using the recycled reinforcing fibers.

In addition, since the reinforcing fibers are less likely to be entangled after the resin component in the fiber-reinforced resin material is dissolved and the reinforcing fiber bundles are exposed during treatment, the treatment solution can uniformly permeate through the reinforcing fibers in the fiber-reinforced resin material, and thus the dissolution reaction of the resin component can uniformly proceed.

Furthermore, in the reinforcing-fiber recovery reactor 1 according to the present embodiment, a reaction can be performed while the fixing mechanism 30 presses and fixes the fiber-reinforced resin material. Therefore, a variety of fiber-reinforced resin materials can be subjected to treatment regardless of the size and shape. For example, finely cut fiber-reinforced resin materials or large prepreg sheets can be subjected to treatment to recover recycled reinforcing fibers.

The reinforcing-fiber recovery reactor 1 according to the present embodiment can also be used for washing and deliquoring the recovered recycled reinforcing fibers. Therefore, a plurality of steps for recovering recycled reinforcing fibers can be performed using the reinforcing-fiber recovery reactor 1 without changing the device.

Further, in the reinforcing-fiber recovery reactor 1 according to the present embodiment, in which the pressing member 31 is configured to be reciprocable, a treatment solution can be agitated as the pressing member 31 reciprocates. In the present embodiment, since the support member 35 can reciprocate as the pressing member 31 reciprocates, agitation can be performed while the fiber-reinforced resin material is fixed.

2. Method of Producing Recycled Reinforcing Fibers

Next, a method of producing recycled reinforcing fibers according to an embodiment of the present invention will be described. The method of producing recycled reinforcing fibers according to the present invention includes a dissolving step of subjecting a fiber-reinforced resin material containing reinforcing fibers and a resin component to treatment with a treatment solution containing a solvent to dissolve at least part of the resin component in the treatment solution, wherein the fiber-reinforced resin material is subjected to treatment with the treatment solution in the dissolving step while being pressed and fixed.

The method of producing recycled reinforcing fibers according to the present invention may be carried out by any device, but in the following description, a representative example in which the above-mentioned reinforcing-fiber recovery reactor according to the present embodiment is used will be described in detail. FIGS. 3 to 6 are partial cross-sectional views illustrating an example of operation of the reinforcing-fiber recovery reactor in the method of producing recycled reinforcing fibers according to the present embodiment. In the following description, each step in the method of producing recycled reinforcing fibers according to the present embodiment will be described.

2.1. Preparation Step

First, prior to the dissolving step, a fiber-reinforced resin material 100 used in the dissolving step is prepared. As described above, the fiber-reinforced resin material is a resin material reinforced by embedded reinforcing fibers. Examples of the fiber-reinforced resin material 100 include, but are not limited to, carbon fiber reinforced plastics (CFRP), glass fiber reinforced plastics (GFRP), glass-mat reinforced thermoplastics (GMT), aramid-fiber-reinforced plastics (AFRP), Kevlar fiber reinforced plastics (KFRP), Dyneema fiber-reinforced plastics (DFRP), basalt fiber reinforced plastics, boron fiber reinforced plastics, and prepregs thereof. Among these, a relatively large amount of carbon fiber reinforced plastics is used and a large amount of energy is consumed in production of carbon fibers, so it is desired to recover carbon fibers from the used carbon fiber reinforced plastics and/or prepregs thereof and reuse them.

In addition, the reinforcing fibers in the fiber-reinforced resin material 100 may be in the form of fiber bundles (tows) in which a plurality of reinforcing fibers are aligned in one direction, or in the form of a woven fabric or a non-woven fabric in which fiber bundles of reinforcing fibers are used as warp and well, or the reinforcing fibers may be arranged at random positions and orientations. In particular, when the reinforcing fibers in the form of a fiber bundle or a woven fabric are extracted by a solvent method, permeation of the treatment solution is difficult to proceed, and the shape and orientation of the reinforcing fibers tend to be misaligned. Therefore, the method according to the present embodiment is suitable for recovering reinforcing fibers from the fiber-reinforced resin material containing reinforcing fibers in the form of a fiber bundle or a woven fabric.

Further, the reinforcing fibers may be in the form of chips, and examples thereof include chopped fibers obtained by cutting fiber bundles, chips of a woven fabric, and the like.

The resin component contained in the fiber-reinforced resin material 100 is not particularly limited, and may be, for example, either a thermosetting resin or a thermoplastic resin. The thermosetting resin may be uncured or may be a cured product.

Examples of the thermosetting resin include, but are not limited to, epoxy resins, unsaturated polyester resins, vinyl ester resins, phenol resins, cyanate resins, polyimide resins, melamine resins, urethane resins, polycarbonate resins, polyacetal resins, and the like, and these can be used singly or in combination of two or more for the resin component.

Examples of the thermoplastic resin include, but are not limited to, polyamides, polyolefins, polyesters, polycarbonates, acrylic resins, acrylonitrile-butadiene-styrene copolymers, polyether ketones, polyphenylene sulfides, and the like, and these can be used singly or in combination of two or more for the resin component.

Further, the fiber-reinforced resin material 100 may have a sheet shape, or may be in the form of cut chips. In particular, the method according to the present embodiment can be suitably used for the sheet-shaped fiber-reinforced resin material 100, from which it has been difficult to recover reinforcing fibers.

The size of the fiber-reinforced resin material 100 is not particularly limited as long as it can be accommodated in the accommodation space 111 of the reaction vessel 10. However, in consideration of maintaining the direction of the reinforcing fibers in the fiber-reinforced resin material 100, the length of each piece of the fiber-reinforced resin material 100 may be, for example, 100 mm or more, and preferably 500 mm or more and 3,000 mm or less. More specifically, as the fiber-reinforced resin material 100, for example, a fiber-reinforced resin material sheet having a laminate thickness of approximately 300 mm and a size of 1,000 mm×500 mm can be used.

2.2. Dissolving Step

Figure 3:
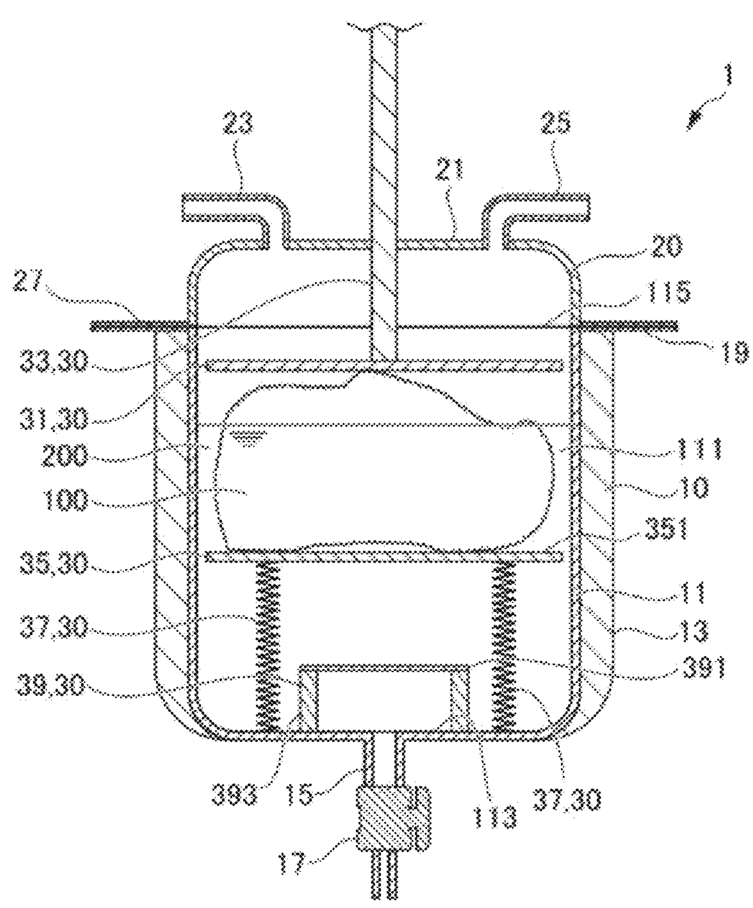
FIG. 3 is a partial cross-sectional view illustrating operation of the reinforcing-fiber recovery reactor shown in FIG. 1.
Figure 4:
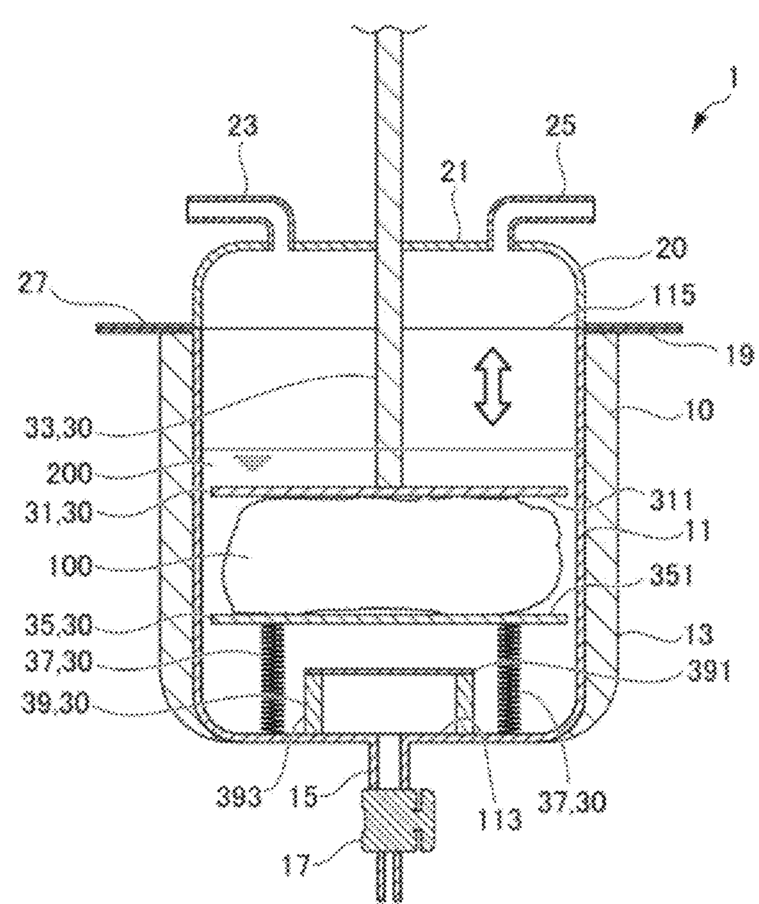
FIG. 4 is a partial cross-sectional view illustrating operation of the reinforcing-fiber recovery reactor shown in FIG. 1.

In this step, the prepared fiber-reinforced resin material 100 is subjected to treatment with a treatment solution 200 containing a solvent so that at least part of a resin component is dissolved in the treatment solution 200. In the present embodiment, specifically, the fiber-reinforced resin material 100 and the treatment solution 200 are introduced into the accommodation space 111 of the reaction vessel 10 of the reinforcing-fiber recovery reactor 1 as shown in FIGS. 3 and 4, and subjected to treatment in the reaction vessel 10. In the following description, the treatment solution 200 will be described first, and then a specific procedure will be described.

(i) Treatment Solution

The treatment solution 200 in this step contains at least a solvent, and at least part of the resin component in the fiber-reinforced resin material 100 is dissolved. The term "resin component is dissolved" as used herein means not only that the resin component itself directly dissolves in the treatment solution 200, but also that the resin component decomposes to produce a reaction product, and the reaction product dissolves in the treatment solution 200.

The solvent is a main component of the treatment solution 200. The solvent is not particularly limited as long as it can dissolve the resin component of the fiber-reinforced resin material 100 or a reaction product in this step, and may be, for example, water and/or various organic solvents.

Examples of the organic solvents include, but are not limited to, alcohol-based solvents, ether-based solvents, ester-based solvents, ketone-based solvents, amide-based solvents, aromatic hydrocarbons, halogenated aromatic hydrocarbons, halogenated aliphatic hydrocarbons, and the like, and these can be used singly or in combination of two or more.

Examples of the alcohol-based solvents include aliphatic alcohol-based solvents, aromatic alcohol-based solvents, glycol-based solvents and other polyhydric alcohols such as glycerin.

Examples of aliphatic alcohol-based solvents include acyclic aliphatic alcohols such as 1-butanol, 2-butanol, 2-methyl-1-propanol, 2-methyl-2-propanol, 1-pentanol, 2-pentanol, 3-pentanol, 2-methyl-1-butanol, 2-methyl-2-butanol, 3-methyl-1-butanol, 3-methyl-2-butanol, 2,2-dimethyl-1-propanol, 1-hexanol, 2-hexanol, 3-hexanol, 2-ethylhexanol, 2-methyl-1-pentanol, 4-methyl-2-pentanol, 2-ethyl-1-butanol, 1-heptanol, 2-heptanol, 3-heptanol, dodecanol, methanol and ethanol; and alicyclic alcohols such as cyclohexanol, 1-methylcyclohexanol, 2-methylcyclohexanol, 3-methylcyclohexanol and 4-methylcyclohexanol.

Examples of the aromatic alcohol-based solvents include phenol, cresol, benzyl alcohol and phenoxyethanol.

Examples of the glycol-based solvents include ethylene glycol, ethylene glycol monomethyl ether, ethylene glycol monoethyl ether, ethylene glycol monopropyl ether, ethylene glycol monobutyl ether, diethylene glycol, diethylene glycol monomethyl ether, diethylene glycol monoethyl ether, diethylene glycol monopropyl ether, diethylene glycol monobutyl ether, triethylene glycol, triethylene glycol monomethyl ether, triethylene glycol monoethyl ether, tetra ethylene glycol, polyethylene glycol (molecular weight 200 to 400), 1,2-propanediol, 1,3-propanediol, 1,2-butanediol, 1,3-butanediol, 1,4-butanediol, 2,3-butanediol, 1,5-pentanediol and dipropylene glycol.

Examples of the ether-based solvents include aliphatic ethers such as dimethyl ether, diethyl ether, ethyl methyl ether, dipropyl ether, diisopropyl ether, dibutyl ether and dihexyl ether; cyclic ethers such as 1,3-dioxolane, 1,4-dioxane, tetrahydrofuran and furan; and aromatic-containing ethers such as anisole, phenetole, diphenyl ether and benzofuran.

Examples of the ester-based solvents include methyl formate, ethyl formate, propyl formate, butyl formate, isobutyl formate, pentyl formate, methyl acetate, ethyl acetate, propyl acetate, isopropyl acetate, butyl acetate, isobutyl acetate, pentyl acetate, isopentyl acetate, 3-methoxybutyl acetate, 2-ethylbutyl acetate, 2-ethylhexyl acetate, cyclohexyl acetate, benzyl acetate, methyl propionate, ethyl propionate, butyl propionate, isopentyl propionate, methyl lactate, ethyl lactate, butyl lactate, methyl butyrate, ethyl butyrate, butyl butyrate, isopentyl butyrate, isobutyl isobutyrate, ethyl isovalerate, isopentyl isovalerate, methyl benzoate, ethyl benzoate, propyl benzoate, butyl benzoate, γ-butyrolactone, diethyl oxalate, dibutyl oxalate, diethyl malonate, methyl salicylate, ethylene glycol diacetate, tributyl borate, trimethyl phosphate and triethyl phosphate.

Examples of the ketone-based solvents include acetone, methyl ethyl ketone, 2-pentanone, 3-pentanone, 2-hexanone, methyl isobutyl ketone, 2-heptanone, 4-heptanone, diisobutyl ketone, cyclohexanone, methylcyclohexanone, phorone, isophorone, acetylacetone, acetophenone, diethylketone and diacetone alcohol.

Examples of the amide-based solvents include formamide. N-methylformamide. N,N-dimethylformamide, N,N-diethylformamide, acetamide, N-methylacetamide, N,N-dimethylacetamide, 2-pyrrolidone. N-methyl-2-pyrrolidone, caprolactam and carbamic acid ester.

Examples of the aromatic hydrocarbons include benzene, toluene and xylene.

Examples of the halogenated aromatic hydrocarbons include orthochlorophenol and orthodichlorobenzene.

Examples of the halogenated aliphatic hydrocarbons include chloroform and methylene chloride.

The solvent content in the treatment solution 200 is not particularly limited, but may be, for example, 0.01 mass % or more and 100 mass % or less, preferably 40 mass % or more and 60 mass % or less, and more preferably 80 mass % or more and 100 mass % or less.

Further, the treatment solution 200 may contain a catalyst. The catalyst is not particularly limited as long as it catalyzes the dissolution of the resin component in the fiber-reinforced resin material 100, and examples thereof include acidic substances and basic substances. These substances can improve the solubility of the resin component in a solvent, for example, by adding a hydrogen ion, a hydroxide ion, or the like to a functional group of the resin component, or by decomposing the resin component. In particular, when the solvent contains a protic solvent, especially water, the catalytic action of acidic substances and basic substances is further improved.

Examples of the acidic substance include inorganic acids, organic acids, salts thereof, and mixtures thereof. Examples of the inorganic acids include nitric acid, sulfuric acid, hydrochloric acid and phosphoric acid, and these can be used singly or in combination of two or more. Examples of the phosphate include orthophosphate, metaphosphate, hypophosphate, phosphite, hypophosphite, pyrophosphate, trimetaphosphate, tetrametaphosphate and pyrophosphite. Examples of the organic acids include formic acid, acetic acid, citric acid, succinic acid and oxalic acid.

Examples of the salts of inorganic acids or organic acids include salts of alkali metals (for example, sodium, potassium, cesium, rubidium, or the like) and/or alkaline earth metals (for example, beryllium, magnesium, calcium, strontium, barium, or the like) of the inorganic acids or organic acids described above.

Among these, inorganic acids, in particular, nitric acid, sulfuric acid, hydrochloric acid and phosphoric acid are preferred since they are easily available and tend to contribute to promotion of the dissolution of the resin component.

Further, when the treatment solution 200 contains an acidic substance as a catalyst, the content of the acidic substance can be appropriately selected depending on the type of the acidic substance used, the type of the solvent in the treatment solution 200, and the resin component in the target fiber-reinforced resin material 100. The content of the acidic substance in the treatment solution 200 may be, for example, 0.01 mass % or more and 100 mass % or less, and in particular 10 mass % or more and 50 mass % or less.

Examples of the basic substances include inorganic basic substances such as hydroxides, carbonates, hydrogen carbonates, sulfates, sulfites and nitrates of lithium, alkali metals and alkaline earth metals; and amine compounds such as dimethylamine and diethylamine, and these can be used singly or in combination of two or more. Examples of the alkali metals include sodium, potassium, cesium and rubidium. Examples of the alkaline earth metals include beryllium, magnesium, calcium, strontium and barium.

Among these, hydroxides, carbonates and hydrogen carbonates of alkali metals are preferred since they are easily available and tend to contribute to promotion of the dissolution of the resin component. More specifically, the basic substance preferably contains one or more selected from the group consisting of sodium hydroxide, potassium hydroxide, sodium hydrogen carbonate, sodium carbonate, potassium hydrogen carbonate and potassium carbonate.

Further, when the treatment solution 200 contains a basic substance as a catalyst, the content of the basic substance can be appropriately selected depending on the type of the basic substance used, the type of the solvent in the treatment solution 200, and the resin component in the target fiber-reinforced resin material 100. The content of the basic substance in the treatment solution 200 may be, for example, 0.01 mass % or more and 100 mass % or less, and in particular 10 mass % or more and 50 mass % or less.

(ii) Procedure

First, as shown in FIG. 3, the fiber-reinforced resin material 100 is introduced into the accommodation space 111 of the reaction vessel 10. In the present embodiment, the fiber-reinforced resin material 100 is disposed between the pressing member 31 and the support member 35 of the fixing mechanism 30.

Then, the treatment solution 200 is injected into the accommodation space 111 through the injection port 23. The treatment solution 200 may be collectively injected into the accommodation space 111, or the components constituting the treatment solution 200 may be separately injected into the accommodation space 111. In injection of the treatment solution 200, the fixing mechanism 30 may not necessarily fix the fiber-reinforced resin material 100.

Next, the fiber-reinforced resin material 100 is subjected to treatment with the treatment solution. In this case, as shown in FIG. 4, treatment with the treatment solution 200 is performed while the pressing member 31 of the fixing mechanism 30 presses and fixes the fiber-reinforced resin material 100.

The pressure of the pressing surface 311 when the pressing member 31 presses the fiber-reinforced resin material 100 is not particularly limited, but may be, for example, $8.5\times10^{-5}$ Pa or more and 8.5 Pa or less, and preferably $8.5\times10^{-4}$ Pa or more and $8.5^{-1}$ Pa or less.

During treatment with the treatment solution 200, the pressing member 31 is preferably reciprocated vertically to agitate the treatment solution 200. As the pressing member 31 is reciprocated, the support member 35 supported by the elastic member 37 reciprocates in accordance with the reciprocation of the pressing member 31. Therefore, the fiber-reinforced resin material 100 is fixed between the pressing member 31 and the support member 35 of the fixing mechanism 30 even when the pressing member 31 is reciprocated. Thus, the treatment solution 200 can be agitated while the fiber-reinforced resin material 100 is fixed.

Conventionally, a general agitating blade or the like is used to agitate a treatment solution, but in this case, the reinforcing fibers exposed from the fiber-reinforced resin material may be damaged by the agitating blade, or the reinforcing fibers may be entangled with the agitating blade. Therefore, it has been difficult to recover the reinforcing fibers while maintaining the shape and orientation of the reinforcing fibers. On the other hand, according to the present embodiment, agitation is performed while the fixing mechanism 30 fixes the fiber-reinforced resin material 100 to thereby suppress the above problem. Accordingly, it is possible to recover the reinforcing fibers while maintaining the shape and orientation of the reinforcing fibers.

Further, the moving distance (one-way distance) of the pressing member 31 that reciprocates when agitating the treatment solution 200 using the fixing mechanism 30 is not particularly limited, but may be, for example, 5 mm or more and 1,000 mm or less, and preferably 50 mm or more and 300 mm or less.

The temperature of the treatment solution 200 during treatment is not particularly limited and varies depending on the type of the treatment solution 200, and may be, for example, 30° C. or more and 300° C. or less, and preferably 50° C. or more and 100° C. or less. The temperature of the treatment solution 200 is adjusted by operating the temperature control jacket 13.

The treatment time with the treatment solution 200 is not particularly limited, and may be 1 minute or more and 1,440 minutes or less, and preferably 10 minutes or more and 60 minutes or less after the target temperature is reached.

In addition, the treatment with the treatment solution 200 may be performed under normal pressure, reduced pressure, or increased pressure. When the treatment with the treatment solution 200 is performed under increased pressure, the pressure may be, for example, 0.11 MPa or more and 7.0 MPa or less, and in particular 0.11 MPa or more and 2.0 MPa or less. In consideration of safety and economy, the treatment with the treatment solution 200 is preferably performed under normal pressure.

Due to the treatment with the treatment solution 200, at least part of the resin component is eluted from the fiber-reinforced resin material 100 into the treatment solution, whereby the reinforcing fibers can be recovered.

2.3. Deliquoring Step

Figure 5:
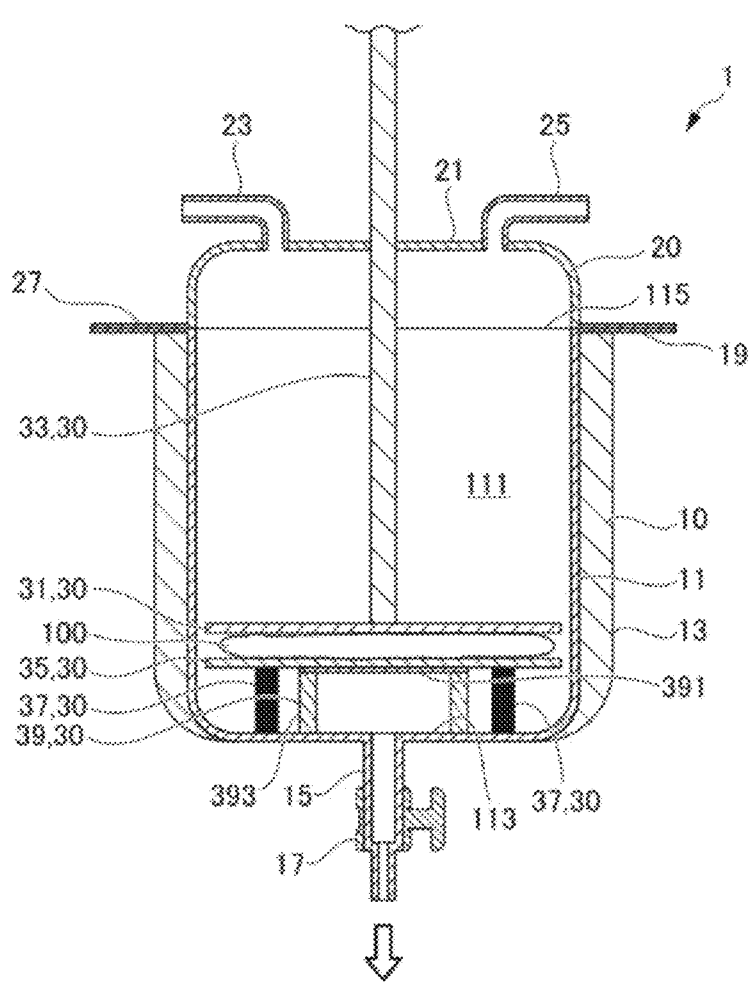
FIG. 5 is a partial cross-sectional view illustrating operation of the reinforcing-fiber recovery reactor shown in FIG. 1.

After the treatment with the treatment solution 200, the valve 17 is operated to open the drain port 15, as shown in FIG. 5, so that the treatment solution 200 is discharged from the drain port 15.

In this case, the pressing member 31 preferably presses the fiber-reinforced resin material 100 to compress the fiber-reinforced resin material 100. This enables efficient deliquoring. Specifically, when the pressing member 31 moves downward, the support member 35 moves accordingly to a position where it abuts the regulating member 39. As the pressing member 31 further presses the fiber-reinforced resin material 100 with an appropriate pressure, deliquoring can be performed.

2.4. Washing Step

Next, washing is performed as necessary. Washing can be performed by exposing the fiber-reinforced resin material 100 to a cleaning solution. Specifically, washing can be performed by replacing the treatment solution 200 with a cleaning solution in the above dissolving step and deliquoring step. The temperature of the cleaning solution and the washing time during washing can be appropriately set.

Washing can be performed while the fixing mechanism 30 fixes the fiber-reinforced resin material 100. Accordingly, it is possible to wash and recover the reinforcing fibers while maintaining the shape and orientation of the reinforcing fibers contained in the fiber-reinforced resin material 100.

Examples of the cleaning solution include water and various organic solvents described above as the solvent of the treatment solution 200, and these can be used singly or in combination of two or more.

The cleaning solution may contain an acidic substance or a basic substance. These substances can be used to adjust the liquid properties so that a resin component remaining in the fiber-reinforced resin material 100 and a reaction product thereof can be removed.

Each of the dissolving step, deliquoring step and washing step described above can be performed multiple times as necessary. For example, after the dissolving step and deliquoring step are repeated multiple times, the washing step may be performed. Alternatively, for example, after the dissolving step is performed multiple times, the deliquoring step may be performed, and then the washing step may be performed a required number of times. Alternatively, for example, the dissolving step, deliquoring step and washing step may be performed in this order a required number of times.

2.5. Drying Step

After the resin component is dissolved and removed from the fiber-reinforced resin material 100 as described above, the fiber-reinforced resin material 100 may be dried. Drying may be performed, for example, by circulating a gas in the accommodation space 111 of the reaction vessel 10 with an air supply means (not shown). The circulated gas is not particularly limited, but is preferably air or an inert gas such as nitrogen from the viewpoint of safety.

Further, during drying, the fiber-reinforced resin material 100 may be heated. This accelerates drying. Heating may be performed, for example, by using the temperature control jacket 13 or by introducing a heated gas into the reaction vessel 10. The temperature of the gas during heating may be, for example, 0° C. or more and 400° C. or less, and preferably 80° C. or more and 110° C. or less.

Heating may be performed while the fixing mechanism 30 fixes the fiber-reinforced resin material 100. Accordingly, it is possible to dry the reinforcing fibers while maintaining the shape and orientation of the reinforcing fibers contained in the fiber-reinforced resin material 100.

2.6. Recovery Step

Figure 6:
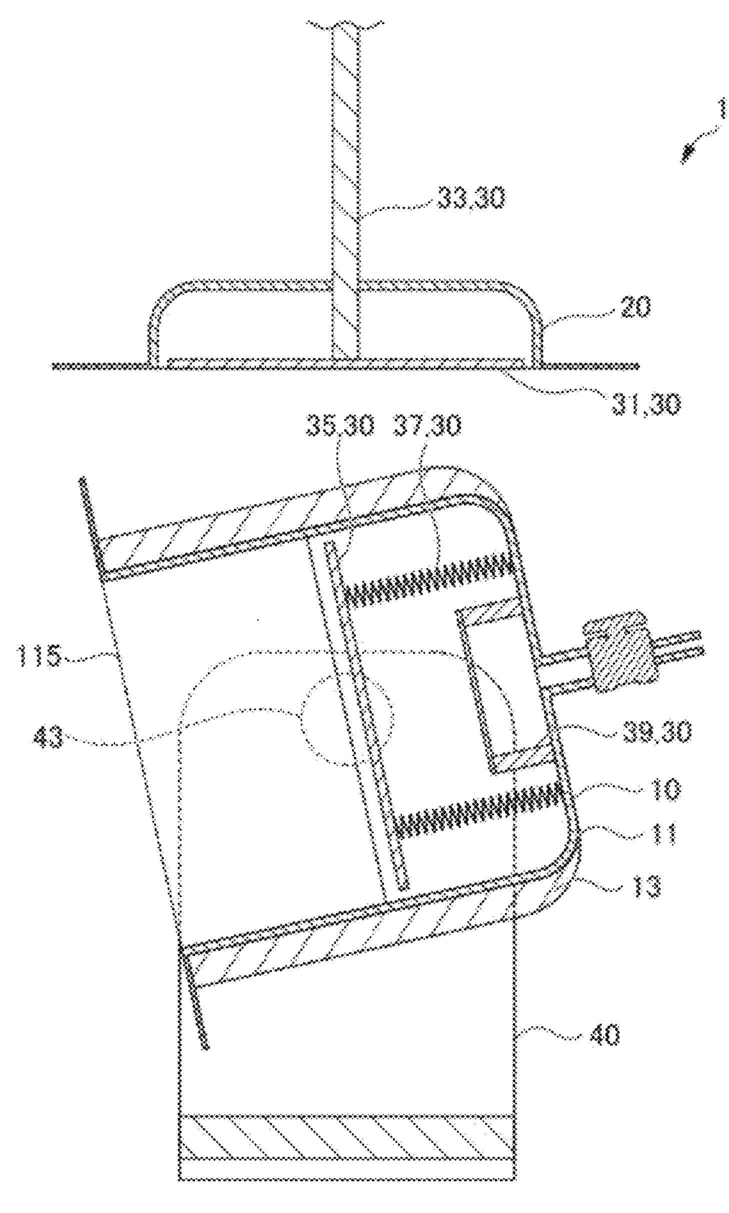
FIG. 6 is a partial cross-sectional view illustrating operation of the reinforcing-fiber recovery reactor shown in FIG. 1.

Through the above steps, the reinforcing fibers are recovered from the fiber-reinforced resin material 100 to obtain recycled reinforcing fibers. In this step, as shown in FIG. 6, the opening 115 of the reaction vessel 10 is tilted downward around the rotary shaft 43 of the support base 40 so that the recycled reinforcing fibers can be taken out easily.

Thus, recycled reinforcing fibers can be obtained. In the method of producing recycled reinforcing fibers according to the present embodiment, the resin component in the fiber-reinforced resin material 100 is dissolved in the treatment solution 200 containing a solvent while the fixing mechanism 30 presses and fixes the fiber-reinforced resin material 100. Accordingly, when the fiber-reinforced resin material 100 is subjected to treatment with the treatment solution 200 containing the solvent, the shape of the reinforcing fibers in the fiber-reinforced resin material 100 becomes less likely to be deformed. In particular, even after the resin component in the fiber-reinforced resin material 100 is dissolved and the reinforcing fibers are exposed during treatment, the reinforcing fibers are less likely to be entangled since they are fixed. As a result, it is possible to maintain the shape and fiber direction of the obtained recycled reinforcing fibers, and for example, maintain the fiber direction of the obtained recycled reinforcing fibers in one direction, which improves the physical properties, such as physical strength, of the fiber-reinforced resin material produced using the recycled reinforcing fibers.

In addition, since the reinforcing fibers are less likely to be entangled after the resin component in the fiber-reinforced resin material 100 is dissolved and the reinforcing fiber bundles are exposed during treatment, the treatment solution can uniformly permeate through the reinforcing fibers in the fiber-reinforced resin material 100, and thus the dissolution reaction of the resin component can uniformly proceed.

Furthermore, in the method according to the present embodiment, a reaction can be performed while the fixing mechanism 30 presses and fixes the fiber-reinforced resin material. Therefore, a variety of fiber-reinforced resin materials 100 can be subjected to treatment regardless of the size and shape. For example, finely cut fiber-reinforced resin materials or large prepreg sheets can be subjected to treatment to recover recycled reinforcing fibers.

3. Modified Examples

Next, some modified examples of the above embodiment of the present invention will be described. The following description will focus on the differences from the embodiment described above, and the description of the same components will be omitted.

Figure 7:
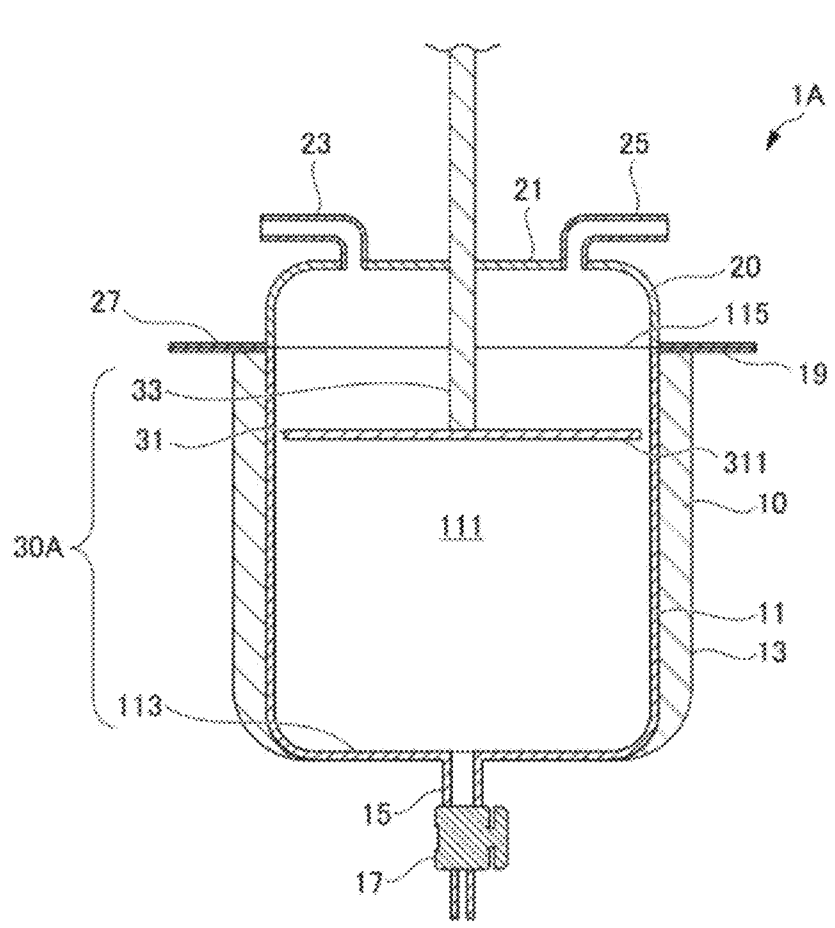
FIG. 7 is a perspective view schematically illustrating a reinforcing-fiber recovery reactor according to another embodiment of the present invention.

In the above embodiment, the support member 35 supported by the elastic member 37 is provided, but the present invention is not limited thereto, and the support member 35 may be omitted, for example, as in a reinforcing-fiber recovery reactor 1A shown in FIG. 7. In this case, the bottom 113 of the reaction vessel body 11 functions as a support member, and the pressing member 31, the control member 33 and the bottom 113 constitute a fixing mechanism 30A.

Further, in the above embodiment, the fixing mechanism 30 is configured such that the pressing member 31 and the support member 35 press and fix the fiber-reinforced resin material 100 in the vertical direction, but the present invention is not limited thereto, and the fixing mechanism may press and fix the fiber-reinforced resin material in any direction. For example, the pressing member and the support member may be disposed to press and fix the fiber-reinforced resin material in the horizontal direction.

Further, in the above embodiment, the pressing member 31 and the support member 35 have a plate shape, but the present invention is not limited thereto. For example, holes may be formed in the pressing member and the support member. This reduces the fluid resistance during agitation. Alternatively, the pressing member and the support member may be mesh sheets.

Further, in the above embodiment, agitation of the treatment solution 200 is performed by vertically reciprocating the pressing member 31 and the support member 35, the present invention is not limited thereto. For example, the reaction vessel may be provided with an agitating device at a position that does not come into contact with the fiber-reinforced resin material. Alternatively, agitation may be performed by moving the reaction vessel while fixing the position of the fixing mechanism. The mode of motion of the reaction vessel is not particularly limited, and may be, for example, a reciprocating motion in the vertical direction and/or horizontal direction or a rotary motion.

Further, for example, in the above embodiment, the elastic member 37 is described as a compression coil spring, but the present invention is not limited thereto, and the elastic member may be formed of any elastic member. Examples of such an elastic member include a leaf spring such as a laminated leaf spring and a thin leaf spring, a torsion spring, a volute spring, and a polymer elastic body such as rubber or elastomer.

Further, for example, in the above embodiment, the reaction vessel 10 and the reaction vessel body 11 are described as having a cylindrical shape, but the present invention is not limited thereto. For example, the shape of the reaction vessel body 11 may be changed so that the accommodation space has a substantially rectangular parallelepiped shape.

Further, for example, in the method of producing recycled reinforcing fibers according to the above embodiment, an example using the reinforcing-fiber recovery reactor according to the present embodiment has been described, but the present invention is not limited thereto, and the method of producing recycled reinforcing fibers according to the present invention may not necessarily use the reinforcing-fiber recovery reactor according to the present invention described above.

Although the preferred embodiments of the present invention have been described in detail with reference to the accompanying drawings, the present invention is not limited to these examples. It is obvious that a person skilled in the art can conceive of various alterations or modifications within the scope of technical idea recited in the claims, and these should be construed as being within the technical scope of the present invention.

REFERENCE SIGNS LIST

1 Reinforcing-fiber recovery reactor
10 Reaction vessel
11 Reaction vessel body
13 Temperature control jacket
15 Drain port
17 Valve
19 Flange
20 Lid
21 Lid body
23 Injection port
25 Exhaust port
27 Flange
30 Fixing mechanism
31 Pressing member
33 Control member
35 Support member
37 Elastic member
39 Regulating member
40 Support base
41 Support base body
43 Rotary shaft
100 Fiber-reinforced resin material
200 Treatment solution

The invention claimed is:

1. A reinforcing-fiber recovery reactor used for recovering reinforcing fibers from a fiber-reinforced resin material by a solvent method, the reactor comprising:

a reaction vessel that can accommodate the fiber-reinforced resin material and a solvent; and a fixing structure comprising a pressing structure capable of pressing the fiber-reinforced resin material, the fixing structure being capable of fixing the accommodated fiber-reinforced resin material by pressing the fiber-reinforced resin material with the pressing structure, wherein the pressing structure has a pressing surface configured to be pressed against the fiber-reinforced resin material, the pressing structure being reciprocable in a direction perpendicular to the pressing surface.

2. The reinforcing-fiber recovery reactor according to claim 1, wherein the pressing structure has a plate shape.

3. The reinforcing-fiber recovery reactor according to claim 1, wherein the fixing structure comprises a support to support the fiber-reinforced resin material between the pressing structure and the support.

4. The reinforcing-fiber recovery reactor according to claim 3, wherein the support has a plate shape.

5. The reinforcing-fiber recovery reactor according to claim 3, wherein the support is reciprocable toward and away from the pressing structure.

6. The reinforcing-fiber recovery reactor according to claim 3, further comprising an elastic structure that supports the support.

7. The reinforcing-fiber recovery reactor according to claim 6, wherein the elastic structure is a compression coil spring.

8. The reinforcing-fiber recovery reactor according to claim 3, further comprising a regulating structure that regulates movement of the support.

9. The reinforcing-fiber recovery reactor according to claim 1, wherein the reaction vessel has an opening for introducing the fiber-reinforced resin material, and the reaction vessel is configured to be tiltable to tilt the opening downward.

10. The reinforcing-fiber recovery reactor according to claim 1, wherein the reinforcing fibers comprise carbon fibers.

11. A method of producing recycled reinforcing fibers, the method comprising a step of subjecting a fiber-reinforced resin material comprising reinforcing fibers and a resin component to treatment with a treatment solution comprising a solvent using the reinforcing-fiber recovery reactor according to claim 1 to dissolve at least part of the resin component in the treatment solution, wherein the fiber-reinforced resin material is subjected to treatment with the treatment solution in the step while being fixed by the fixing structure.

12. The method of producing recycled reinforcing fibers according to claim 11, wherein the solvent is agitated in the step while the fiber-reinforced resin material is fixed.

* * * * *